US009776142B2

(12) United States Patent
Wu et al.

(10) Patent No.: US 9,776,142 B2
(45) Date of Patent: Oct. 3, 2017

(54) POROUS POLYMERIC MEMBRANE WITH HIGH VOID VOLUME

(71) Applicant: Pall Corporation, Port Washington, NY (US)

(72) Inventors: Xiaosong Wu, Pensacola, FL (US); Yolando David, Glen Cove, NY (US); Shane Edward Harton, Port Washington, NY (US); Amarnauth Singh, Selden, NY (US)

(73) Assignee: Pall Corporation, Port Washington, NY (US)

( * ) Notice: Subject to any disclaimer, the term of this patent is extended or adjusted under 35 U.S.C. 154(b) by 125 days.

(21) Appl. No.: 14/193,745

(22) Filed: Feb. 28, 2014

(65) Prior Publication Data
US 2015/0246321 A1 Sep. 3, 2015

(51) Int. Cl.
*B01D 69/02* (2006.01)
*B01D 71/06* (2006.01)
(Continued)

(52) U.S. Cl.
CPC .......... *B01D 69/02* (2013.01); *B01D 67/003* (2013.01); *B01D 67/0011* (2013.01);
(Continued)

(58) Field of Classification Search
None
See application file for complete search history.

(56) References Cited

U.S. PATENT DOCUMENTS 2,913,419 A  11/1959 Alexander
2,974,108 A   3/1961 Alexander
(Continued)

FOREIGN PATENT DOCUMENTS

CA  2509628 C  11/2007
DE  10058258 A1  8/2002
(Continued)

OTHER PUBLICATIONS

Cai et al., "An improved convective self-assembly method for the fabrication of binary colloidal crystals and inverse structures", *Journal of Colloid and Interface Science*, 380, 42-50 (2012).
(Continued)

*Primary Examiner* — Krishnan S Menon
(74) *Attorney, Agent, or Firm* — Leydig Voit & Mayer

(57) ABSTRACT

Microporous membranes comprising a single integral layer having first and second microporous surfaces; and, a porous bulk between the microporous surfaces, wherein the bulk comprises at least a first region and a second region; the first region comprising a first set of pores having outer rims, prepared by removing introduced silica dissolvable nanoparticles, the first set of pores having a first controlled pore size, and a second set of pores connecting the outer rims, the second set of pores having a second controlled pore size, and a polymer matrix supporting the first set of pores, wherein the first controlled pore size is greater than the second controlled pore size; the second region comprising a third set of pores prepared by phase inversion, the third set of pores having a third controlled pore size, filters including the membranes, and methods of making and using the membranes, are disclosed.

8 Claims, 5 Drawing Sheets

(51) Int. Cl.
*B01D 69/12* (2006.01)
*B01D 67/00* (2006.01)
*B01D 69/10* (2006.01)

(52) U.S. Cl.
CPC .......... *B01D 69/10* (2013.01); *B01D 69/105* (2013.01); *B01D 69/12* (2013.01); *B01D 71/06* (2013.01); *B01D 2323/18* (2013.01); *B01D 2323/21* (2013.01); *B01D 2325/021* (2013.01)

(56) References Cited

U.S. PATENT DOCUMENTS

| | | |
|---|---|---|
| 4,177,228 A | 12/1979 | Prolss |
| 4,188,418 A | 2/1980 | Livingston |
| 4,289,600 A | 9/1981 | Lazarz et al. |
| 4,289,681 A | 9/1981 | Nauroth et al. |
| 4,764,497 A | 8/1988 | Yuasa et al. |
| 4,940,571 A | 7/1990 | Su et al. |
| 5,024,826 A | 6/1991 | Linton |
| 5,100,581 A | 3/1992 | Watanabe et al. |
| 5,102,917 A | 4/1992 | Bedwell et al. |
| 5,221,497 A | 6/1993 | Watanabe et al. |
| 5,453,260 A | 9/1995 | Nakazawa et al. |
| 5,938,874 A | 8/1999 | Palomo et al. |
| 6,255,359 B1* | 7/2001 | Agrawal .............. A61L 27/18 521/61 |
| 6,372,806 B1 | 4/2002 | Keiser et al. |
| 6,548,264 B1 | 4/2003 | Tan et al. |
| 6,680,013 B1 | 1/2004 | Stein et al. |
| 6,770,130 B2 | 8/2004 | Kato et al. |
| 6,800,267 B2 | 10/2004 | Schubert et al. |
| 6,855,427 B2 | 2/2005 | Kunkeler et al. |
| 6,890,436 B2 | 5/2005 | Komatsu et al. |
| 6,906,109 B2 | 6/2005 | Paszkowski |
| 6,929,764 B2 | 8/2005 | Jiang et al. |
| 7,438,875 B2 | 10/2008 | Do et al. |
| 7,901,727 B2 | 3/2011 | Hofmann et al. |
| 8,003,707 B2 | 8/2011 | Holland |
| 8,052,788 B2 | 11/2011 | MacDonald |
| 8,163,388 B2 | 4/2012 | Do et al. |
| 8,168,563 B2 | 5/2012 | Do et al. |
| 8,211,193 B2 | 7/2012 | Mahulikar et al. |
| 8,288,455 B1 | 10/2012 | Miller |
| 8,309,113 B2 | 11/2012 | Hofmann et al. |
| 8,431,034 B2 | 4/2013 | Petronis et al. |
| 8,518,361 B2 | 8/2013 | Chang et al. |
| 2002/0011443 A1* | 1/2002 | Komatsu et al. ............. 210/650 |
| 2003/0107150 A1 | 6/2003 | Hamanaka et al. |
| 2005/0234136 A1 | 10/2005 | Holland et al. |
| 2006/0283095 A1 | 12/2006 | Mahulikar et al. |
| 2007/0125701 A1* | 6/2007 | Ramaswamy et al. ....... 210/490 |
| 2010/0155325 A1 | 6/2010 | Zhang et al. |
| 2010/0272996 A1 | 10/2010 | Holmes et al. |
| 2010/0311871 A1 | 12/2010 | Suemura et al. |
| 2011/0251057 A1 | 10/2011 | Keiser et al. |
| 2012/0107601 A1 | 5/2012 | Weitz et al. |
| 2012/0276275 A1 | 11/2012 | Ergang et al. |
| 2013/0112613 A1 | 5/2013 | Kang et al. |
| 2013/0115295 A1 | 5/2013 | Wang et al. |
| 2013/0134081 A1* | 5/2013 | Kang .................. B01D 67/003 210/196 |
| 2013/0146539 A1 | 6/2013 | Larue et al. |
| 2013/0199995 A1 | 8/2013 | Jiang et al. |
| 2015/0246320 A1 | 9/2015 | David et al. |
| 2015/0246322 A1 | 9/2015 | Larue et al. |
| 2015/0246323 A1 | 9/2015 | Singh et al. |
| 2015/0246324 A1 | 9/2015 | Singh et al. |
| 2015/0246325 A1 | 9/2015 | Singh et al. |
| 2015/0246326 A1 | 9/2015 | David et al. |
| 2015/0246328 A1 | 9/2015 | David et al. |

FOREIGN PATENT DOCUMENTS

| | | |
|---|---|---|
| DE | 102006010831 A1 | 9/2007 |
| DE | 102006036863 A1 | 2/2008 |
| EP | 477689 A1 | 4/1992 |
| EP | 1 166 859 A2 | 1/2002 |
| EP | 2 476 724 A1 | 7/2012 |
| EP | 2 805 759 A1 | 11/2014 |
| JP | 2008-272636 A | 11/2008 |
| WO | WO 2005/063365 A1 | 7/2005 |
| WO | WO 2012/097967 A1 | 7/2012 |
| WO | WO 2013/130893 A2 | 9/2013 |

OTHER PUBLICATIONS

Ding et al., "Experimental Investigation of Particle-Assisted Wetting", *Journal of American Chemical Society*, 128, 4930-4931 (2006).

Gates et al., "Fabrication and Characterization of Porous Membranes with Highly Ordered Three-Dimensional Periodic Structures", *Chemistry of Materials*, 11, 2827-2836 (1999).

Hoa et al., "Preparation of porous materials with ordered hole structure", *Advances in Colloid and Interface Science*, 121, 9-23 (2006).

Holland et al., "Synthesis of Highly Ordered, Three-Dimensional, Macroporous Structures of Amorphous or Crystalline Inorganic Oxides, Phosphates, and Hybrid Composites", *Chemistry of Materials*, 11, 795-805 (1999).

Jiang et al., "Large-Scale Fabrication of Wafer-Size Colloidal Crystals, Macroporous Polymers and Nanocomposites by Spin-Coating", *Journal of American Chemical Society*, 126, 13778-13786 (2004).

Jiang et al., "Single-Crystal Colloidal Multilayers of Controlled Thickness", *Chemistry of Materials*, 11, 2132-2140 (1999).

Jiang et al., "Template-Directed Preparation of Macroporous Polymers with Oriented and Crystalline Arrays of Voids", *Journal of American Chemical Society* 121, 11630-11637 (1999).

Johnson et al., "Ordered Mesoporous Polymers of Tunable Pore Size from Colloidal Silica Templates", *Science Magazine*, 283, 963-965 (1999).

Kellenberger et al., "Soluble nanoparticles as removable pore templates for the preparation of polymer ultrafiltration membranes", *Journal of Membrane Science*, 387-388, 76-82 (2012)r.

Li et al., "Preparation of mesoporous calcium doped silica spheres with narrow size dispersion and their drug loading and degradation behavior", *Microporous and Mesoporous Materials*, 102, 151-158 (2007).

Mitchell et al., "Iron(III)-Doped, Silica Nanoshells: A Biodegradable Form of Silica", *Journal of American Chemical Society*, 134, 13997-14003 (2012).

Park et al., "Fabrication of Three-Dimensional Macroporous Membranes with Assemblies of Microspheres as Templates", *Chemistry of Materials*, 10, 1745-1747 (1998).

Park et al., "Macroporous Membranes with Highly Ordered and Three-Dimensionally Interconnected Spherical Pores", *Advanced Materials*, 10, 1045-1048 (1998).

Stein et al., "Colloidal crystal templating of three-dimensionally ordered macroporous solids: materials for photonics and beyond", *Current Opinion in Solid State and Materials Science*, 5, 553-564 (2001).

Stein, A., "Sphere templating methods for periodic porous solids", *Microporous and Mesoporous Materials*, 44-45, 227-239 (2001).

Ulbricht, M., "Advanced functional polymer membranes", *Polymer*, 47, 2217-2262 (2006).

Velev et al., "Colloidal crystals as templates for porous materials", *Current Opinion in Colloid and Interface Science*, 5, 56-63 (2000).

Velev et al., "Structured Porous Materials viz Colloidal Crystal Templating: From Inorganic Oxides to Metals", *Advanced Materials*, 12, 531-534 (2000).

Wachner et al., "Utilising Spontaneous Self-Organization of Particles to Prepare Asymmetric, Hierarchical Membranes Comprising Microsieve-Like Parts", *Advanced Materials*, 25, 278-283 (2013).

(56) References Cited

OTHER PUBLICATIONS

Wang et al., "Inverse colloidal crystal microfiltration membranes", *Journal of Membrane Science*, 365, 302-310 (2010).

Wong et al., "Colloidal Crystal Films: Advances in Universality and Perfection", *Journal of American Chemical Society*, 125, 15589-15598 (2003).

Xia et al., "Monodispersed Colloidal Spheres: Old Materials with New Applications", *Advanced Materials*, 12, 693-713 (2000).

Xu et al., "Polymer-Silica Hybrid Monolayers as Precursors for Ultrathin Free-Standing Porous Membranes", *Langmuir*, 18, 2363-2367 (2002).

Yan et al., "A Simple and Effective Method for the Preparation of Porous Membranes with Three-Dimensionally Arranged Pores", *Advanced Materials*, 16, 911-915 (2004).

Yan et al., "Hierarchically Struchtured Assembly of Polymer Microsieves, made by a Combination of Phase Separation Micromolding and Float-Casting", *Advanced Materials*, 24, 1551-1557 (2012).

Yan et al., "Polymer Membranes with Two-Dimensionally Arranged Pores Derived from Monolayers of Silica Particles", *Chemistry of Materials*, 16, 1622-1626 (2004).

Zakhidov et al., "Carbon Structures with Three-Dimensional Periodicity at Optical Wavelengths", *Science Magazine*, 282, 897-901 (1998).

Australian Patent Office, Patent Examination Report No. 1 in Patent Application No. 201477784, dated Sep. 21, 2015.

Ahmad, A. et al., "Recent development in additives modifications of polyethersulfone membrane for flux enhancement," *Chemical Engineering Journal*, vol. 223, pp. 246-267 (2013).

Liu, H., et al., "A hard-template process to prepare three-dimensionally macroporous polymer electrolyte for lithium-ion batteries," *Electrochimica Acta*, vol. 121, pp. 328-336 (2014).

Munakata, H., et al., "Three-dimensionally ordered macroporous polyimide composite membrane with controlled pore size for direct methanol fuel cells," *Journal of Power Sources*, vol. 178, pp. 596-602 (2008).

Weber, J., et al., "Mesoporous Poly(benzimidazole) Networks via Solvent Mediated Templating of Hard Spheres," *Macromolecules*, vol. 40, pp. 1299-1304 (2007).

Wilke, A., et al., "Mesoporous Polymer Networks—Ultraporous DVB Resins by Hard-Templating of Close-Packed Silica Spheres," *Macromolecular Rapid Communications*, vol. 33, pp. 785-790 (2012).

Wu, D., et al., "Design and Preparation of Porous Polymers," *Chemical Reviews*, vol. 112, pp. 3959-4015 (2012).

European Patent Office, Extended European Search Report in European Patent Application No. 14198509.3 (dated Jul. 16, 2015).

\* cited by examiner

US 9,776,142 B2

POROUS POLYMERIC MEMBRANE WITH HIGH VOID VOLUME

BACKGROUND OF THE INVENTION

Polymeric membranes are used to filter a variety of fluids. However, there is a need for membranes that provide high throughput performance.

The present invention provides for ameliorating at least some of the disadvantages of the prior art. These and other advantages of the present invention will be apparent from the description as set forth below.

BRIEF SUMMARY OF THE INVENTION

An embodiment of the invention provides a microporous membrane comprising a single integral layer having (i) a first microporous surface; (ii) a second microporous surface; and, (iii) a porous bulk between the first microporous surface and the second microporous surface, wherein the bulk comprises at least a first region and a second region; (a) the first region comprising a first set of pores having outer rims, prepared by removing introduced dissolvable silica nanoparticles, the first set of pores having a first controlled pore size, and a second set of pores connecting the outer rims of the first set of pores, the second set of pores having a second controlled pore size, and a polymer matrix supporting the first set of pores, wherein the first controlled pore size is greater than the second controlled pore size; (b) the second region comprising a third set of pores prepared by phase inversion, the third set of pores having a third controlled pore size wherein the third controlled pore size is at least about 10% less than, or at least about 10% greater than, the first controlled pore size.

In some embodiments, the bulk comprises at least one additional region arranged between the first region and the second region, the additional region having at least a fourth set of pores having a fourth controlled pore size.

In some embodiments, the controlled pore size of pores having outer rims in a region is greater than the controlled pore size of pores prepared by phase inversion in another region, e.g., wherein the region comprising pores prepared by phase inversion comprises the retentive portion of the membrane. In some other embodiments, the controlled pore size of pores having outer rims in a region is less than the controlled pore size of pores prepared by phase inversion in another region, e.g., wherein the region comprising pores having outer rims comprises the retentive portion of the membrane.

In accordance with other embodiments of the invention, filters and filter devices comprising the membranes, as well of methods of making and using the membranes, are provided.

BRIEF DESCRIPTION OF THE SEVERAL VIEWS OF THE DRAWING(S)

FIG. 1 is a scanning electron micrograph (SEM) showing a surface view of the first region of an embodiment of a membrane according to the present invention, showing a first set of pores having connecting outer rims (one pore highlighted in dashed lines), and a second set of pores (one pore highlighted in solid line) located in the connecting outer rims of the first set of pores.

FIG. 2 illustrates hexagonal packing of the first set of pores (formed by dissolving of particles) in the first region of a membrane according to an embodiment of the invention, wherein the hexagonal packing is 74 volume percent. FIG. 2 also illustrates the matrix ("polymer formed interstitials") supporting the first set of pores, and the second set of pores connecting the outer rims of the first set of pores.

FIG. 3 diagrammatically illustrates a cross-sectional view of a membrane according to an embodiment of the present invention, also showing the first region and the second region.

Figure 6A:
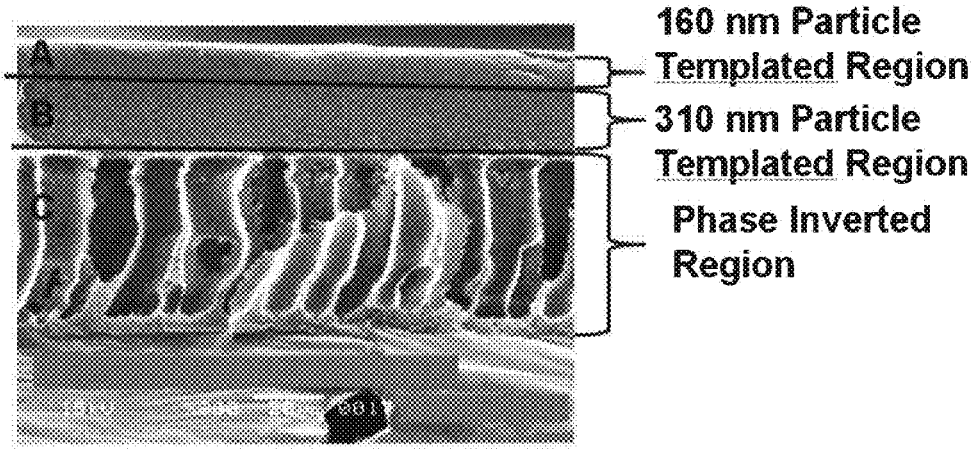
Figure 6B:
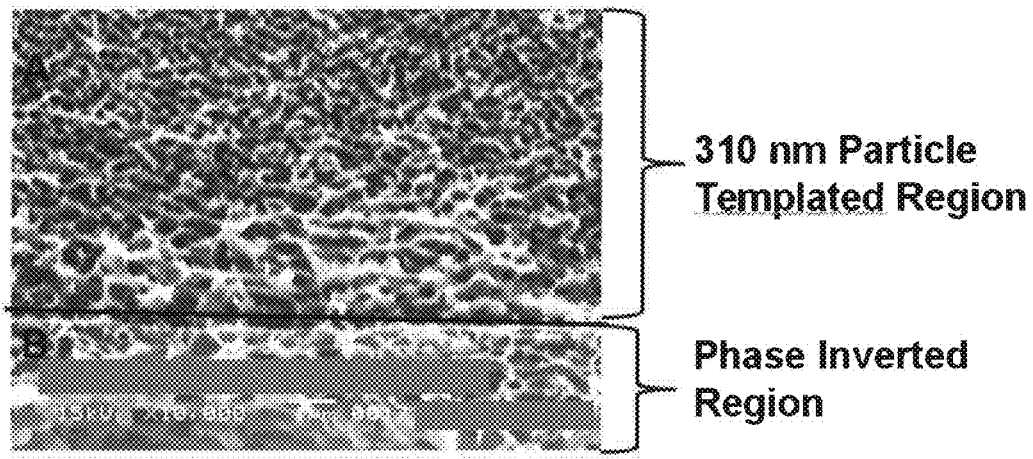
Figure 6C:
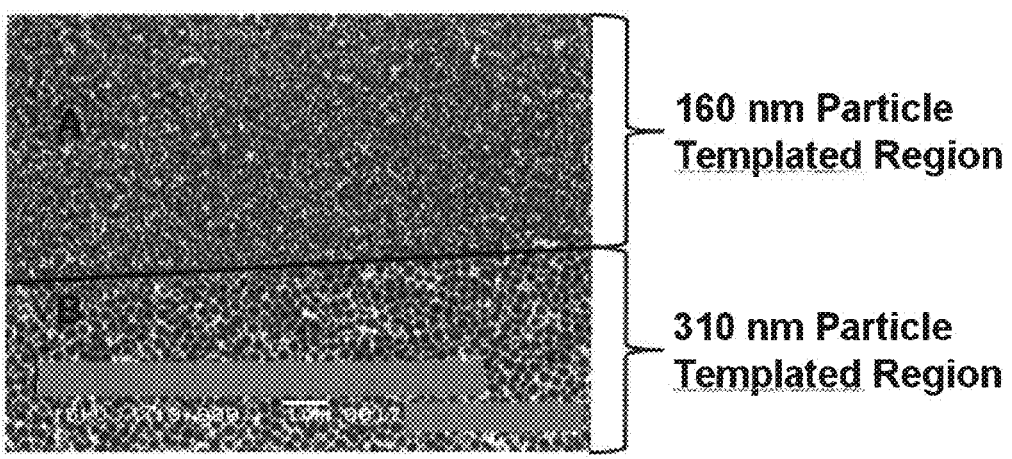

FIGS. 6A, 6B, and 6C are SEMs showing a cross-sectional view (FIG. 6A) and an enlarged partial cross-sectional views (FIGS. 6B and 6C) of a membrane according to another embodiment of the present invention, also showing the first region and the second region, and an additional region between the first and second regions, wherein the second region has an asymmetric pore structure. FIG. 6B shows an enlarged partial cross-sectional view of the additional region and the second region, and FIG. 6C shows an enlarged partial cross-sectional view of the additional region and the first region.

Figure 7A:
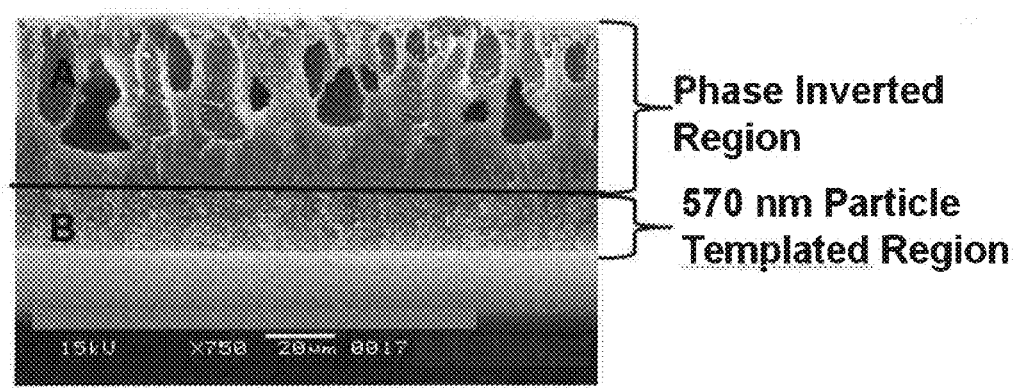
Figure 7B:
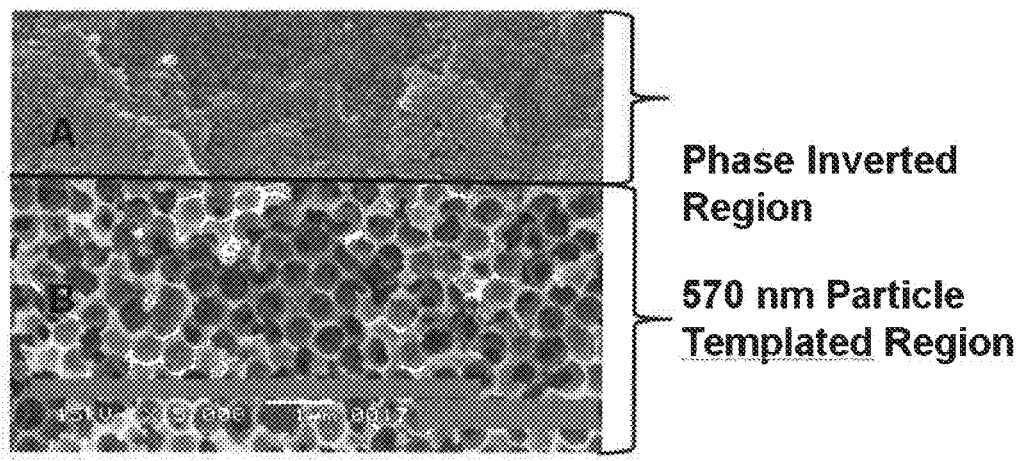

FIGS. 7A and 7B are SEMs showing a cross-sectional view (FIG. 7A) and an enlarged partial cross-sectional view (FIG. 7B) of a membrane according to another embodiment of the present invention, also showing the first region and the second region, wherein the second region has an asymmetric pore structure.

Figure 8:
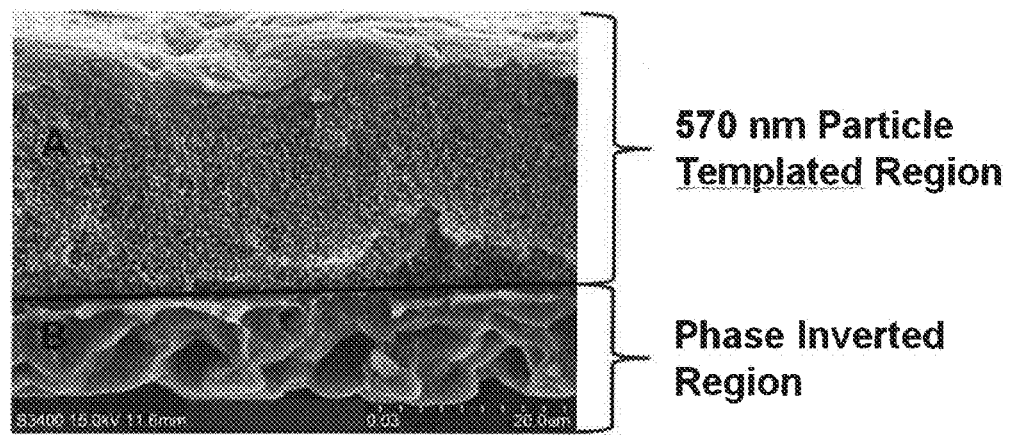

FIG. 8 is an SEM showing a cross-sectional view of a membrane according to another embodiment of the present invention, also showing the first region and the second region, wherein the second region has a symmetric pore structure.

DETAILED DESCRIPTION OF THE INVENTION

An embodiment of the invention provides a microporous membrane comprising a single integral layer having (i) a first microporous surface; (ii) a second microporous surface; and, (iii) a porous bulk between the first microporous surface and the second microporous surface, wherein the bulk comprises at least a first region and a second region; (a) the first region comprising a first set of pores having outer rims, prepared by removing introduced dissolvable silica nanoparticles, the first set of pores having a first controlled pore size, and a second set of pores connecting the outer rims of the first set of pores, the second set of pores having a second controlled pore size, and a polymer matrix supporting the first set of pores, wherein the first controlled pore size is greater than the second controlled pore size; (b) the second region comprising a third set of pores prepared by phase inversion, the third set of pores having a third controlled pore size wherein the third controlled pore size is at least about 10% less than, or at least about 10% greater than, the first controlled pore size.

In accordance with an embodiment, the controlled pore size of the first set of pores (and/or the controlled pore size of another set of pores prepared by removing introduced silica nanoparticles) is in the range of from about 50 nm to about 1000 nm, for example, from about 160 nm to about 630 nm. Thus, for example, the pore size of the first set of pores is about 160 nm, about 180 nm, about 200 nm, about 220 nm, about 240 nm, about 260 nm, about 280 nm, about 300 nm, about 320 nm, about 340 nm, about 360 nm, about 380 nm, about 400 nm, about 420 nm, about 440 nm, about 460 nm, about 480 nm, about 500 nm, about 520 nm, about 540 nm, about 560 nm, about 580 nm, about 600 nm, or about 620 nm.

The third controlled pore size can be at least about 10% less than the first controlled pore size, or the third controlled pore size can be at least about 10% greater than the first controlled pore size. For example, in an embodiment, the pore size of the third set of pores is at least 10%, for example, 20%, 30%, 40%, 50%, 60%, 70%, or 80%, different from the pore size of the first set of pores. The pore size of the third set of pores can be larger or smaller than the pore size of the first set of pores.

In some embodiments, the first region and second region contact each other, the first region being bounded by the first microporous surface and the second region, and the second region being bounded by the second microporous surface and the first region.

In some embodiments, the bulk comprises at least one additional region arranged between the first region and the second region, the additional region having at least a fourth set of pores having a fourth controlled pore size.

In an embodiment, the second controlled pore size in the first region (or the controlled pore size in any other region with respect to the pores connecting pores having outer rims) is in a ratio in the range of about 0.2 to about 0.4 times the first controlled pore size (or the controlled pore size with respect to pores having outer rims). In some embodiments wherein the third controlled pore size is at least about 10% less than the first controlled pore size, the fourth controlled pore size is at least about 10% less than the second controlled pore size. In some embodiments wherein the third controlled pore size is at least about 10% greater than the first controlled pore size, the fourth controlled pore size is at least about 10% greater than the second controlled pore size.

In some embodiments, the controlled pore size of pores having outer rims in a region is greater than the controlled pore size of pores prepared by phase inversion in another region, e.g., wherein the region comprising pores prepared by phase inversion comprises the retentive portion of the membrane. In some other embodiments, the controlled pore size of pores having outer rims in a region is less than the controlled pore size of pores prepared by phase inversion in another region, e.g., wherein the region comprising pores having outer rims comprises the retentive portion of the membrane.

Membranes according to the invention are integral (i.e., the regions are bonded together such that the membrane behaves as a single structure that does not delaminate or separate under normal use conditions). For example, while making the membranes, portions of each region can infiltrate each other and mix.

In accordance with an embodiment of the present invention, a membrane is provided, the membrane comprising a single integral layer having (i) a first microporous surface (ii) a second microporous surface; and, (iii) a porous bulk between the first microporous surface and the second microporous surface, wherein the bulk has at least a first region and a second region, the first region contacting the second region; (a) the first region comprising a first set of pores having outer rims, prepared by removing introduced dissolvable silica nanoparticles, the first set of pores having a first controlled pore size, and a second set of pores connecting the outer rims of the first set of pores, the second set of pores having a second controlled pore size, and a polymer matrix supporting the first set of pores, wherein the first controlled pore size is greater than the second controlled pore size, the first region being bounded by the first microporous surface and the second region; (b) the second region comprising a third set of pores prepared by phase inversion, the third set of pores having a third controlled pore size wherein the third controlled pore size is at least about 10% greater than, or at least about 10% less than, than the first controlled pore size, wherein the second region is disposed below and generally parallel to the first region, the second region being bounded by the second microporous surface and the first region.

In some embodiments, the controlled pore size of pores having outer rims in a region is greater than the controlled pore size of pores prepared by phase inversion in another region, e.g., wherein the region comprising pores prepared by phase inversion comprises the retentive portion of the membrane. In some other embodiments, the controlled pore size of pores having outer rims in a region is less than the controlled pore size of pores prepared by phase inversion in another region, e.g., wherein the region comprising pores having outer rims comprises the retentive portion of the membrane.

In some embodiments, the controlled pore size of the set of pores connecting the outer rims (e.g., the second controlled pore size) is less than the controlled pore size of pores prepared by phase inversion (e.g., the second controlled pore size is less than the third controlled pore size).

In other embodiments, the membrane has a bulk comprising at least one additional region, for example, arranged between the first region and the second region, the additional region having at least a fourth set of pores having a fourth controlled pore size, typically wherein the fourth controlled pore size is not the same as any of the first, second, and third controlled pore size. In one embodiment, the additional region comprises the fourth set of pores wherein the fourth set of pores have outer rims, prepared by removing introduced dissolvable silica nanoparticles, and a fifth set of pores connecting the outer rims of the fourth set of pores, the fifth set of pores having a fifth controlled pore size, and a polymer matrix supporting the fourth set of pores, wherein the fourth controlled pore size is greater than the fifth controlled pore size. In another embodiment, the additional region comprises the fourth set of pores wherein the fourth set of pores are prepared by phase inversion, wherein the fourth controlled pore size is smaller than the first controlled pore size.

Embodiments of the membrane can have any number of additional regions, wherein the controlled pore size in the region comprises pores with outer rims, prepared by removing introduced dissolvable silica nanoparticles, and an additional controlled pore size comprising pores connecting the outer rims of the fourth set of pores, or the controlled pore size comprises pores prepared by phase inversion.

Typically, in any region having a controlled pore size comprising pores with outer rims, prepared by removing introduced dissolvable nanoparticles, and an additional controlled pore size comprising smaller pores connecting the outer rims of the pores, the controlled pore size of the smaller pores is in a ratio in the range of about 0.2 to about 0.4 times the controlled pore size of the larger pores.

In any region comprising pores prepared by phase inversion, the pore structure can be symmetric or asymmetric.

In an embodiment, the first region of the membrane (or any additional region of the membrane having pores with outer rims supported by a polymer matrix and pores connecting the outer rims) is prepared by introducing dissolvable silica nanoparticles into a solution comprising one or more membrane forming polymers (typically, the membrane forming polymers are dissolved in a solvent or mixture of solvents), casting the nanoparticle-containing polymer solution (preferably, casting the nanoparticle-containing polymer solution on a substrate wherein the substrate has been pretreated with a preconditioning or releasing agent; more preferably, wherein the agent has been dried on the substrate before casting the solution thereon), carrying out phase inversion of the nanoparticle-containing polymer solution to provide a membrane, subsequently dissolving the nanoparticles, and washing the resultant membrane.

The second region (or any additional region of the membrane lacking pores with outer rims supported by a polymer matrix and lacking pores connecting the outer rims) is prepared by phase inversion.

Advantageously, membranes according to the invention can be produced using preformed polymers such as polyethersulfone (PES), polyvinylidene fluoride (PVDF), and polyacrylonitrile (PAN), that are commonly used in commercial membranes. Additionally, the nanoparticles can be dissolved without using hydrofluoric acid, for example, the nanoparticles can be dissolved using safer, more environmentally benign solvents.

In other embodiments, filters and filter devices are provided, the filter and filter devices comprising at least one membrane.

A method of filtering fluid is also provided in accordance with another embodiment of the invention, the method comprising passing the fluid through at least one membrane, or a filter comprising at least one membrane, as described above.

In accordance with an embodiment of the invention, a method of preparing an integral membrane comprising (I) a first region having a controlled pore size comprising pores with outer rims, prepared by removing introduced dissolvable silica nanoparticles, and an additional controlled pore size comprising smaller pores connecting the outer rims of the pores, and (II) a second region comprising pores prepared by phase inversion, comprises (a) casting a dissolvable silica nanoparticle-containing polymer solution onto a substrate or onto a film on the substrate, (b) casting a polymer solution lacking dissolvable silica nanoparticles onto the coated substrate of (a), carrying out phase inversion and obtaining a membrane; (c) dissolving the nanoparticles and obtaining a nanoparticle-depleted membrane comprising the first region and the second region; and (d) washing the nanoparticle-depleted membrane.

In some embodiments, (a) comprises casting the solution on a substrate pretreated with a preconditioning agent or a release agent. In some embodiments of the method, the preconditioning agent or the release agent is dried on the substrate to form a film before casting the solution on the pretreated substrate.

In some embodiments, the method comprises exposing the nanoparticle-containing polymer solution to a temperature in the range of from about 40° C. to about 80° C. for a period in the range of from about 1 minute to about 2 hours.

In some embodiments, the membrane comprises at least one additional region arranged between the first region and the second region, the additional region having at least a fourth set of pores having a fourth controlled pore size. The regions and resultant membranes can be prepared as generally described above (and with reference to the illustrate Examples below), wherein the polymer solutions (containing or lacking dissolvable silica nanoparticles, depending on the desired additional region(s)) are cast on a substrate, or film.

Figure 1:
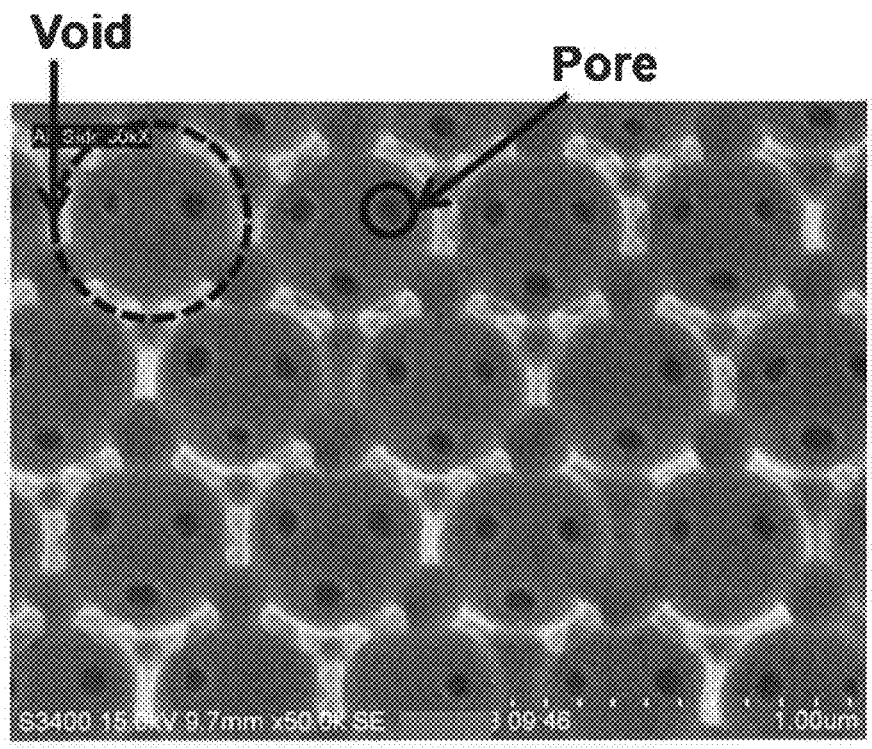

As will be described in more detail below, dissolving the particles creates a first set of pores in the membranes, the first set of pores having outer rims, and located within the outer rims is a second set of pores. As illustrated in FIG. 1, the dashed line highlights an outer rim of a pore in the first set, and the solid line highlights a pore in the second set. The second set of pores allows communication (e.g., fluid flow) from the void within one outer rim into the void of another outer rim.

A variety of dissolvable silica nanoparticles are suitable for use in preparing membranes according to embodiments of the invention. Preferably, the dissolvable particles are not pure silica. Typically, the particles comprise silica nanoparticles ranging in diameter from about 50 nm to about 1000 nm. In an embodiment, the particles comprise silica nanoparticles ranging in diameter from about 50 nm to about 1000 nm, having a density of 1.96 g/cm$^3$ or less. In some embodiments, the silica nanoparticles have a particle density of about 1.93 to about 1.96 g/cm$^3$.

The silica nanoparticles can have a particle size, e.g., diameter, of less than 1000 nm, in particular a particle size of from about 160 nm to about 630 nm. Thus, for example, the nanoparticles have a particle size of about 160 nm, about 180 nm, about 200 nm, about 220 nm, about 240 nm, about 260 nm, about 280 nm, about 300 nm, about 320 nm, about 340 nm, about 360 nm, about 380 nm, about 400 nm, about 420 nm, about 440 nm, about 460 nm, about 480 nm, about 500 nm, about 520 nm, about 540 nm, about 560 nm, about 580 nm, about 600 nm, or about 620 nm.

The silica nanoparticles can be prepared by a method comprising: (a) reacting an orthosilicate and an alcohol or a mixture of alcohols in an aqueous medium in the presence of a salt of a metal of Group Ia or Group IIa, or in the presence of a metalloid compound, optionally in combination with ammonium hydroxide, (b) isolating the resulting nanoparticles, and (c) treating the nanoparticles from (b) with an acid.

In an embodiment, the nanoparticles can be included in the coating composition prior to the acid treatment (c).

In an embodiment, the orthosilicate used in the preparation of the nanoparticles is a tetraalkylorthosilicate. Examples of tetraalkylorthosilicates tetramethylorthosilicate, tetraethylorthosilicate, tetrapropylorthosilicate, tetrabutylorthosilicate, and tetrapentylorthosilicate.

Any suitable alcohol or mixture of alcohols can be used in the preparation of the nanoparticles, for example, the alcohol or mixture of alcohols is selected from methanol, ethanol, propanol, butanol, and mixtures thereof.

The salt of the metal used in the preparation of the nanoparticles can be selected from salts of lithium, sodium, potassium, cesium, magnesium, and calcium. In an embodiment, the salt of the metal is selected from lithium acetate, sodium acetate, sodium metasilicate, sodium formate, potassium acetate, cesium acetate, magnesium acetate, and calcium acetate. In another embodiment, the metalloid compound is a compound of boron, for example, boric acid or a boric acid ester such as alkyl borate. The alkyl borate can be a trialkyl borate such as trimethyl borate or triethyl borate.

The acid employed in (c) of the method above can be a mineral acid or organic acid. Examples of mineral acids include hydrochloric acid, sulfuric acid, and nitric acid, preferably hydrochloric acid or sulfuric acid. Examples of organic acids include acetic acid, formic acid, trifluoroacetic acid, trichloroacetic acid, and p-toluenesulfonic acid, preferably formic acid. The nanoparticles isolated in (b) can be treated with a 1N to 2N acid, e.g., 1N HCl, or 10-50% weight % organic acid in water, e.g., 50% aqueous formic acid, for a period of about 0.5 hr to about 3 hr, preferably about 1 hr to 2 hr. For example, the nanoparticles can be sonicated in an acid bath for the above period. Following the acid treatment, the nanoparticles are isolated from the acid and washed with deionized water and dried under vacuum to obtain the silica nanoparticles.

Illustratively, silica nanoparticles can be prepared as follows. In a 6 L jacketed flask kept at 25° C., 4.8 g lithium acetate dihydrate (LiOAc. $2H_2O$), 2480 mL deionized water (DI-$H_2O$), 2.9 L anhydrous ethanol (EtOH), and 120 mL 28% w/w $NH_3$ in water is stirred for 30 min at 200 rpm using an overhead mixer with PTFE impellers. A solution of 300 mL EtOH with 200 mL tetraethylorthosilicate (TEOS), which is prepared under dry conditions (<10% relative humidity), is rapidly poured into the 6 L flask, and mixing is increased to 400 rpm and a dry air purge (<1% relative humidity) is utilized for 5 min. Mixing is reduced to 200 rpm, the dry air purge is removed, the flask is sealed, and the reaction continues for a total of 1 h. The particles are purified by centrifugation and re-suspension in EtOH three times.

Typical stock solutions comprising the dissolvable nanoparticles, preferably purified dissolvable nanoparticles, comprise the nanoparticles dispersed at concentrations in the range of from about 30 wt % to about 65 wt % dimethyl formamide (DMF), with in the range of from about 0.001% to about 0.1% triethanolamine (TEA).

A variety of procedures are suitable for dissolving the particles. As noted above, the process should avoid using hydrofluoric acid; rather, the nanoparticles should be dissolved using safer, more environmentally benign solvents. For example, the nanoparticle-containing membrane can be placed in a mineral acid (e.g., HCl or $H_2SO_4$) at a concentration in the range of about 0.1 to about 2 moles/L for a period in the range of from about 1 minute to about 1 hour, followed by immersion in an alkaline solution (e.g., KOH or NaOH) at a concentration in the range of about 0.1 to about 4 moles/L for a period in the range of from about 30 minutes to about 24 hours, followed by washing in water (e.g., DI water) for a period in the range of about 30 minutes to about 4 hours. If desired, the membrane can subsequently be dried, e.g., in an oven at a temperature in the range of from about 40° C. to about 80° C. for a period in the range of about 30 minutes to about 2 hours.

Typically, the phase inversion process for producing the membrane involves casting or extruding a polymer solution into a thin film on the substrate, and precipitating the polymer(s) through one or more of the following: (a) evaporation of the solvent and nonsolvent, (b) exposure to a non-solvent vapor, such as water vapor, which absorbs on the exposed surface, (c) quenching in a non-solvent liquid (e.g., a phase immersion bath containing water, and/or another non-solvent or solvent), and (d) thermally quenching a hot film so that the solubility of the polymer is suddenly greatly reduced. Phase inversion can be induced by the wet process (immersion precipitation), vapor induced phase separation (VIPS), thermally induced phase separation (TIPS), quenching, dry-wet casting, and solvent evaporation (dry casting). Dry phase inversion differs from the wet or dry-wet procedure by the absence of immersion coagulation. In these techniques, an initially homogeneous polymer solution becomes thermodynamically unstable due to different external effects, and induces phase separation into a polymer lean phase and a polymer rich phase. The polymer rich phase forms the matrix of the membrane, and the polymer lean phase, having increased levels of solvents and non-solvents, forms pores.

A membrane-forming polymer solution is prepared by dissolving the polymer in a solvent or a mixture of solvents. A variety of polymer solutions are suitable for use in the invention (e.g., for preparing the first and/or second regions), and are known in the art. Suitable polymer solutions can include, polymers such as, for example, polyaromatics; sulfones (e.g., polysulfones, including aromatic polysulfones such as, for example, polyethersulfone (PES), polyether ether sulfone, bisphenol A polysulfone, polyarylsulfone, and polyphenylsulfone), polyamides, polyimides, polyvinylidene halides (including polyvinylidene fluoride (PVDF)), polyolefins, such as polypropylene and polymethylpentene, polyesters, polystyrenes, polycarbonates, polyacrylonitriles ((PANs) including polyalkylacrylonitriles), cellulosic polymers (such as cellulose acetates and cellulose nitrates), fluoropolymers, and polyetherether ketone (PEEK). Polymer solutions can include a mixture of polymers, e.g., a hydrophobic polymer (e.g., a sulfone polymer) and a hydrophilic polymer (e.g., polyvinylpyrrolidone (PVP)).

In addition to one or more polymers, typical polymer solutions comprise at least one solvent, and may further comprise at least one non-solvent. Suitable solvents include, for example, dimethyl formamide (DMF); N,N-dimethylacetamide (DMAC); N-methyl pyrrolidone (NMP); dimethyl sulfoxide (DMSO), methyl sulfoxide, tetramethylurea; dioxane; diethyl succinate; chloroform; and tetrachloroethane; and mixtures thereof. Suitable nonsolvents include, for example, water; various polyethylene glycols (PEGs; e.g., PEG-200, PEG-300, PEG-400, PEG-1000); various polypropylene glycols; various alcohols, e.g., methanol, ethanol, isopropyl alcohol (IPA), amyl alcohols, hexanols, heptanols, and octanols; alkanes, such as hexane, propane, nitropropane, heptanes, and octane; and ketone, ethers and esters such as acetone, butyl ether, ethyl acetate, and amyl acetate; acids, such as acetic acid, citric acid, and lactic acid; and various salts, such as calcium chloride, magnesium chloride, and lithium chloride; and mixtures thereof.

If desired, a solution comprising a polymer can further comprise, for example, one or more polymerization initiators (e.g., any one or more of peroxides, ammonium persulfate, aliphatic azo compounds (e.g., 2,2'-azobis(2-amidinopropane) dihydrochloride (V50)), and combinations thereof), and/or minor ingredients such as surfactants and/or release agents.

Typical stock solutions including a polymer (before combining with a solution comprising the dissolvable nanoparticles) comprise in the range of from about 10 wt % to about 35 wt % resin (e.g., PES, PVDF, or PAN), in the range of from about 0 to about 10 wt % PVP, in the range of from about 0 to about 10 wt % PEG, in the range of from about 0 to about 90 wt % NMP, in the range of from about 0 to about 90 wt % DMF, and in the range of from about 0 to about 90 wt % DMAC.

Suitable components of solutions are known in the art. Illustrative solutions comprising polymers, and illustrative solvents and nonsolvents include those disclosed in, for example, U.S. Pat. Nos. 4,340,579; 4,629,563; 4,900,449; 4,964,990, 5,444,097; 5,846,422; 5,906,742; 5,928,774; 6,045,899; 6,146,747; and 7,208,200.

While a variety of polymeric membranes can be produced in accordance with the invention, in preferred embodiments, the membranes are sulfone membranes (more preferably, polyethersulfone membranes and/or polyarylsulfone membranes), acrylic membranes (e.g., (PANs, including polyalkylacrylonitriles), or semi-crystalline membranes (for example, PVDF membranes and/or polyamide membranes).

The membranes can be cast manually (e.g., poured, cast, or spread by hand onto the substrate) or automatically (e.g., poured or otherwise cast onto a moving bed having the substrate thereon).

A variety of casting techniques, including multiple casting techniques, are known in the art and are suitable. A variety of devices known in the art can be used for casting. Suitable devices include, for example, mechanical spreaders, that comprise spreading knives, doctor blades, or spray/pressurized systems. One example of a spreading device is an extrusion die or slot coater, comprising a casting chamber into which the casting formulation (solution comprising a polymer) can be introduced and forced out under pressure through a narrow slot. Illustratively, the solutions comprising polymers can be cast by means of a doctor blade with knife gaps in the range from about 100 micrometers to about 500 micrometers, more typically in the range from about 120 micrometers to about 400 micrometers.

A variety of casting speeds are suitable as is known in the art. Typically, the casting speed is at least about 3 feet per minute (fpm), more typically in the range of from about 3 to about 40 fpm, in some embodiments, at least about 5 fpm.

A variety of substrates are suitable for preparing membranes according to embodiments of the invention. Preferably, the substrate is a non-paper substrate. Suitable substrates include, for example, glass, a polyester such as polyethylene terephthalate (PET) (e.g., commercially available as MYLAR); polypropylene; polyethylene (including polyethylene naphthalate (PEN); polyethylene terephthalate glycol (PETG)); polyimide; polyphenylene oxide; nylon; and acrylics.

In some embodiments, the substrate has been pretreated with a preconditioning agent or release agent, preferably, wherein the agent is dried before the particle-containing polymer solution is cast on the pretreated substrate. Without being bound to any particular theory, it is believed that, with respect to some substrates and/or polymers, the use of a preconditioning or release agent improves efficiency in separating the dissolvable particle-containing membrane from the substrate, before dissolving the particles.

Preferably, the preconditioning or release agent does not dissolve in solvents used in the casting formulation, is compatible with membrane processing temperatures, sufficiently adheres to the cast film during thermal processing that it does not delaminate, and dissolves readily in solvents that do not dissolve the membrane resin (such that the membrane can be released from the substrate). Examples of suitable preconditioning or release agents include polyvinyl alcohol (PVOH), polyvinylpyrrolidone (PVP), poly(acrylic acid), and poly(methacrylic acid).

Illustratively, a PVOH stock solution can be prepared with about 5 wt % to about 15 wt % PVOH in deionized water, and cast on a substrate using a casting bar with a gap in the range of from about 1 to about 10 mil, and dried in an oven at a temperature in the range of from about 40° C. to about 80° C. for a period in the range of from about 1 minute to about 2 hours.

The membranes can have any suitable pore structure, e.g., a pore size (for example, as evidenced by bubble point, or by $K_L$ as described for, example, U.S. Pat. No. 4,340,479, or evidenced by capillary condensation flow porometry), a mean flow pore (MFP) size (e.g., when characterized using a porometer, for example, a Porvair Porometer (Porvair plc, Norfolk, UK), or a porometer available under the trademark POROLUX (Porometer.com; Belgium)), a pore rating, a pore diameter (e.g., when characterized using the modified OSU F2 test as described in, for example, U.S. Pat. No. 4,925,572), or removal rating media. The pore structure used depends on the size of the particles to be utilized, the composition of the fluid to be treated, and the desired effluent level of the treated fluid.

Figure 2:
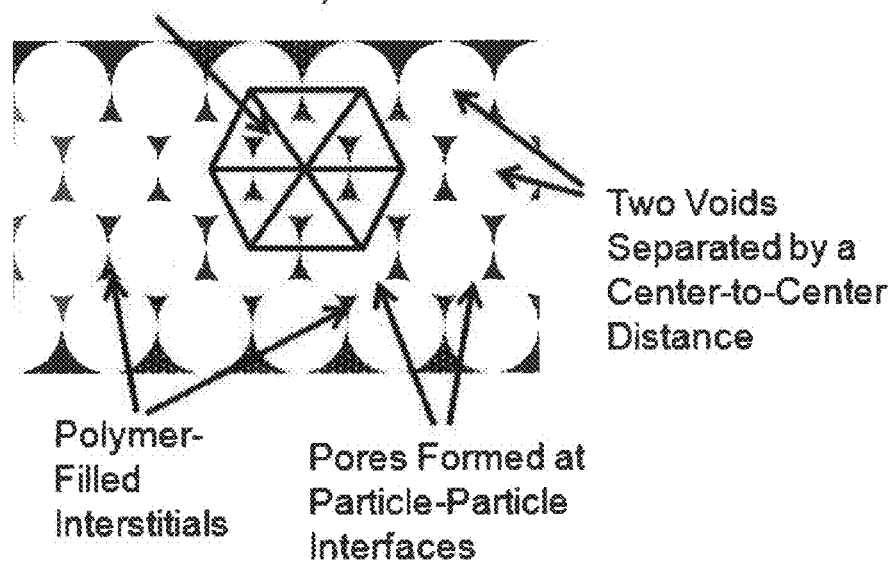

Additionally, the membranes have a desirable hexagonal structure resulting from the first set of pores in the bulk of the membrane. As illustrated in FIG. 2 (showing the first set of pores resulting from dissolving the introduced particles and the hexagonal structure representing the maximum void fraction), the maximum void fraction is 74 volume percent, and membranes according to embodiments of the invention have in the range of from about 66% to about 73% void fraction.

The microporous surfaces of the membranes can have any suitable mean pore size, e.g., as determined by, for example, calculating the average surface pore size from an SEM at 5,000× or 20,000× magnification.

Typically, the thickness of membranes according to embodiments of the invention is in the range of about 1 mil to about 10 mils, preferably, in the range of about 2 mils to about 5 mils.

The membrane can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869. Typically, the membrane has a CWST of greater than about 70 dynes/cm (about $70\times10^{-5}$ N/cm), more typically greater than about 73 dynes/cm (about $73\times10^{-5}$ N/cm), and can have a CWST of about 78 dynes/cm (about $78\times10^{-5}$ N/cm) or more. In some embodiments, the membrane has a CWST of about 82 dynes/cm (about $82\times10^{-5}$ N/cm) or more.

The surface characteristics of the membrane can be modified (e.g., to affect the CWST, to include a surface charge, e.g., a positive or negative charge, and/or to alter the polarity or hydrophilicity of the surface) by wet or dry oxidation, by coating or depositing a polymer on the surface, or by a grafting reaction. Modifications include, e.g., irradiation, a polar or charged monomer, coating and/or curing the surface with a charged polymer, and carrying out chemical modification to attach functional groups on the surface. Grafting reactions may be activated by exposure to an energy source such as gas plasma, vapor plasma, corona discharge, heat, a Van de Graff generator, ultraviolet light, electron beam, or to various other forms of radiation, or by surface etching or deposition using a plasma treatment.

A variety of fluids can be filtered in accordance with embodiments of the invention. Membranes according to embodiments of the invention can be used in a variety of applications, including, for example, diagnostic applications (including, for example, sample preparation and/or diagnostic lateral flow devices), ink jet applications, filtering fluids for the pharmaceutical industry, filtering fluids for medical applications (including for home and/or for patient use, e.g., intravenous applications, also including, for example, filtering biological fluids such as blood (e.g., to remove leukocytes)), filtering fluids for the electronics industry (e.g., filtering photoresist fluids in the microelectronics industry), filtering fluids for the food and beverage industry, clarification, filtering antibody- and/or protein-containing fluids, filtering nucleic acid-containing fluids, cell detection (including in situ), cell harvesting, and/or filtering cell culture fluids. Alternatively, or additionally, membranes according to embodiments of the invention can be used to filter air and/or gas and/or can be used for venting applications (e.g., allowing air and/or gas, but not liquid, to pass therethrough). Membranes according to embodiments of the inventions can be used in a variety of devices, including surgical devices and products, such as, for example, ophthalmic surgical products.

In accordance with embodiments of the invention, the membrane can have a variety of configurations, including planar, pleated, and/or hollow cylindrical.

Membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonated resin.

The following examples further illustrate the invention but, of course, should not be construed as in any way limiting its scope.

Example 1

This example demonstrates the preparation of a membrane according to an embodiment of the invention, having a first region in contact with a second region, wherein the first region has a first set of pores having outer rims, prepared by removing introduced dissolvable nanoparticles, the first set of pores having a first controlled pore size of about 160 nm, and a second set of pores connecting the outer rims of the first set of pores, the second set of pores having a second controlled pore size of about 48 nm, and a polymer matrix supporting the first set of pores, wherein the first controlled pore size is greater than the second controlled pore size, and the second region comprises a third set of pores prepared by phase inversion, the third set of pores having a third controlled pore size wherein the third controlled pore size is larger than the second controlled pore size, and the second region has an asymmetric pore structure.

In this example, the third controlled pore size is less than the first controlled pore size.

Dissolvable nanoparticles are prepared in stock solution as follows: In a jacketed flask kept at 25° C., a solution is prepared consisting of 0.3 mol/L ammonia ($NH_3$), 9.16 mol/L ethanol (ETOH), 23.74 mol/L deionized (DI) water, 0.15 mol/L tetraethoxysilane (TEOS), and 0.0078 mol/L lithium acetate ($CH_3COOLi$), and stirred at 200 rpm for 1 hr. Dynamic light scattering and SEM show particle diameters of approximately 160 nm. Particles are centrifuged, decanted, and re-suspended in ETOH twice. Then, the particles are centrifuged, decanted, and re-suspended in DMF along with 0.1% triethanolamine (TEA) three times. The stock solution has a final concentration of 55% (w/w) particles.

The polymer (resin) stock solution (to be combined with the particle stock solution) is prepared as follows: In a jacketed kettle kept at 40° C. using a circulating bath, 30% (w/w) PES resin (BASF, Ultrason E 6020 P), 15% (w/w) NMP, and 55% (w/w) DMF are mixed at 800 rpm using an overhead mixer for 4 hr. The solution is placed under vacuum at 200 mbar for 30 minutes to deaerate the solution.

Polyvinyl Alcohol (PVOH) stock solution is prepared as follows: In a jacketed kettle kept at 90° C., a solution is prepared by combining 10% w/w PVOH (96% Hydrolyzed, Scientific Polymer Products) with 90% DI water and stirring at 200 rpm for 16 hr.

A first casting solution is prepared as follows: The resin stock solution and the particle stock solution are combined in a flask along with PVP K90 and PEG-1000 and mixed at 30,000 rpm for 2 min with final concentrations of 42% (w/w) particles, 11% PES, 5% NMP, 41% DMF, 0.5% PVP K90, and 0.5% PEG-1000, followed by deaeration at 200 mbar for 30 min.

Using a casting bar gapped to 5 mil, PVOH stock solution is cast onto a glass plate and placed in an oven at 80° C. for 2 hr. to form a film. Subsequently, the casting solution is cast onto the PVOH film using a 3 mil gapped casting bar and placed in an oven for 15 min at 60° C.

A second polymer (resin) stock solution (a casting solution for preparing the second region including pores prepared by phase inversion) is prepared as follows: In a jacketed kettle kept at 47° C. using a circulating bath, 11% (w/w) PES resin (BASF, Ultrason E 6020 P), 46% (w/w) NMP, 38% PEG-200; 4% DI water, and 1% PVP K40 are mixed at 800 rpm using an overhead mixer for 4 hr. The solution is placed under vacuum at 200 mbar for 30 minutes to deaerate the solution.

Using a casting bar gapped to 5 mil, the second polymer solution is cast on the coated glass plate, and immersed in a coagulation bath (1:1 NMP:DI water) for 5 min., then immersed in DI water at 80° C. for 1 hr. The membrane is soaked in 1 mol/L HCl for 30 min., followed by soaking in 2 mol/L KOH for 18 hr. Subsequently, the membrane is washed with DI water at 25° C. for 2 hr. and dried at 70° C. for 30 min.

Figure 3:
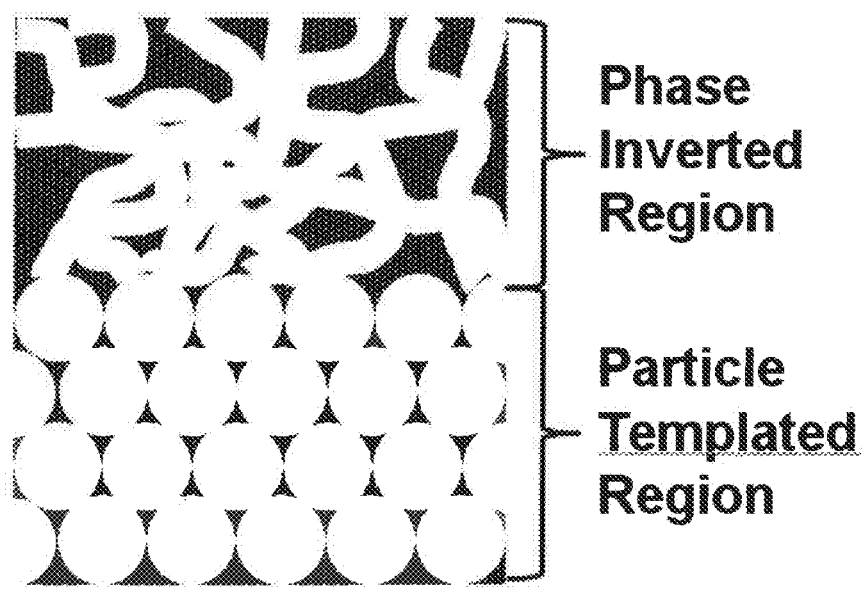
Figure 4A:
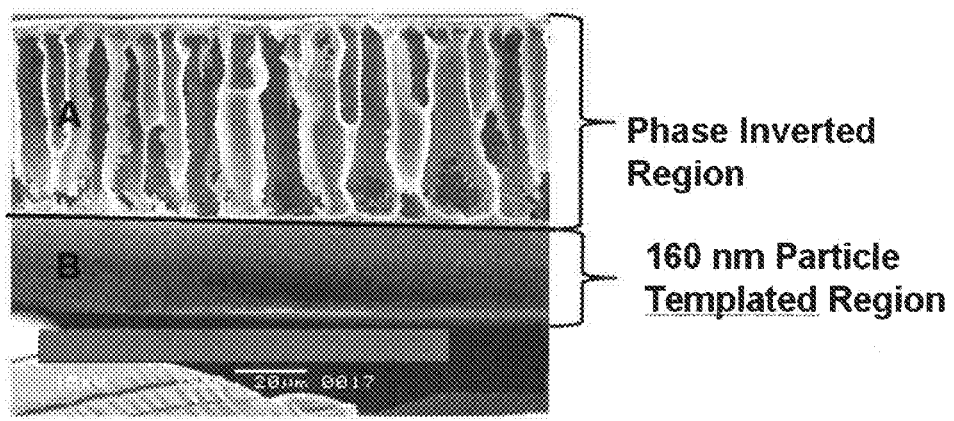
FIGS. 4A and 4B are SEMs showing a cross-sectional view (FIG. 4A) and an enlarged partial cross-sectional view (FIG. 4B) of a membrane according to an embodiment of the present invention, also showing the first region and the second region, wherein the second region has an asymmetric pore structure.
Figure 4B:
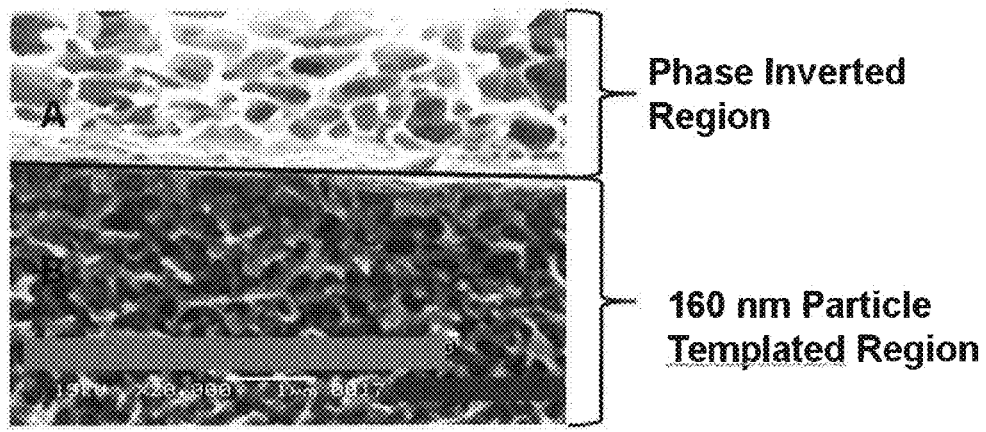

A diagrammatic view of the membrane is shown in FIG. 3. Cross-sectional, and enlarged partial cross-sectional SEM views of the membrane are shown in FIGS. 4A and 4B.

Using SEM analysis and porometry, the second set of pores (in the first region, having the first set of pores having outer rims, prepared by removing introduced dissolvable nanoparticles), that are located in the connections between the outer rims of the first set of pores, have a pore size of about 48 nm.

As analyzed by SEM, the pore structure in the second region, having the pores prepared by phase inversion, comprises an asymmetric pore structure. Neglecting macrovoids, the pore diameters in the phase inversion region decrease by an order of magnitude in the direction from the interface between the region having the first set of pores having outer rims and the region having the pores prepared by phase inversion (about 1 μm to about 3 μm), to the free surface of the region having the pores prepared by phase inversion (about 0.1 μm to about 0.3 μm).

Example 2

This example demonstrates the preparation of a membrane according to another embodiment of the invention, having a first region in contact with a second region, wherein the first region has a first set of pores having outer rims, prepared by removing introduced dissolvable nanoparticles, the first set of pores having a first controlled pore size, and a second set of pores connecting the outer rims of the first set of pores, the second set of pores having a second controlled pore size, and a polymer matrix supporting the first set of pores, wherein the first controlled pore size is greater than the second controlled pore size, and the second region comprises a third set of pores prepared by phase inversion, the third set of pores having a third controlled pore size wherein the third controlled pore size is smaller than the first controlled pore size, and the third controlled pore size is larger than the second controlled pore size, and the second region has an symmetric pore structure.

Dissolvable nanoparticles are prepared in stock solution as follows: In a jacketed flask kept at 25° C., a solution is prepared consisting of 1 mol/L $NH_3$, 8.24 mol/L ETOH, 1 mol/L MeOH, 23.7 mol/L DI water, 0.15 mol/L TEOS and 0.0078 mol/L $Na_2SiO_3$, and stirred at 200 rpm for 1 hr. Dynamic light scattering and SEM show particle diameters of approximately 570 nm. Particles are centrifuged, decanted, and re-suspended in ETOH twice. Then, the particles are centrifuged, decanted, and re-suspended in DMF along with 0.1% TEA three times. The stock solution has a final concentration of 60% (w/w) particles.

The polymer (resin) stock solution (to be combined with the particle stock solution) is prepared as follows: In a jacketed kettle kept at 38° C. using a circulating bath, 33% (w/w) PES resin (BASF, Ultrason E 6020 P), 2% PEG-400, 13% (w/w) NMP, and 52% DMF are mixed at 800 rpm using an overhead mixer for 4 hr. The solution is placed under vacuum at 200 mbar for 30 minutes to deaerate the solution.

A first casting solution is prepared as follows: The resin stock solution and the particle stock solution are combined in a flask and mixed at 30,000 rpm for 2 min with final concentrations of 40% (w/w) particles, 14% PES, 1% PEG-400, 5% NMP, and 40% DMF, followed by deaeration at 200 mbar for 30 min.

Using a casting bar gapped to 5 mil, the first casting solution is cast on a polypropylene support and placed in an oven at 50° C. for 30 min.

A second polymer (resin) stock solution (a casting solution for preparing the second region including pores prepared by phase inversion) is prepared as follows: In a jacketed kettle kept at 38° C. using a circulating bath, 33% (w/w) PES resin (BASF, Ultrason E 6020 P), 2% PEG-400, 13% NMP, and 52% DMF are mixed at 800 rpm using an overhead mixer for 4 hr. The solution is placed under vacuum at 200 mbar for 30 minutes to deaerate the solution.

Using a casting bar gapped to 10 mil, the second polymer solution is cast on the coated polypropylene support, placed in an environmental chamber at 25° C. and 60% relative humidity, and immersed in DI water at 80° C. for 1 hr. The membrane is soaked in 1 mol/L HCl for 1 hr., followed by soaking in 2 mol/L KOH for 5 hr. Subsequently, the membrane is washed with DI water at 25° C. for 2 hr. and dried at 50° C. for 30 min.

Figure 5:
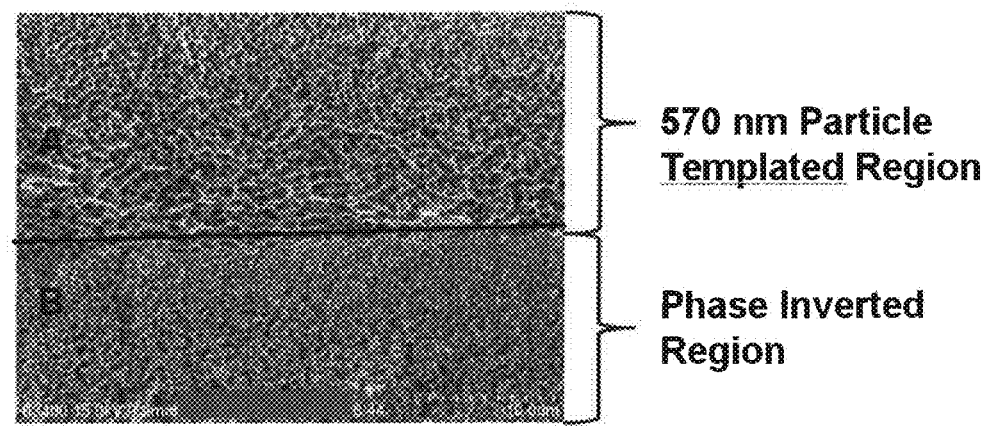
FIG. 5 is an SEM showing a cross-sectional view of a membrane according to another embodiment of the present invention, also showing the first region and the second region, wherein the second region has a symmetric pore structure.

A cross-sectional SEM view of the membrane is shown in FIG. 5.

Using SEM analysis and porometry, the second set of pores (in the first region, having the first set of pores having outer rims, prepared by removing introduced dissolvable nanoparticles), that are located in the connections between the outer rims of the first set of pores, have a pore size of about 171 nm.

As analyzed by SEM of the cross-section, the pore structure in the second region, having the pores prepared by phase inversion, comprises a symmetric pore structure, with average pore diameters of about 0.25 μm, and a voids fraction of about 30% to about 40%.

Example 3

This example demonstrates the preparation of a membrane according to another embodiment of the invention, having a first region, a second region, and an additional region between the first and second regions, the additional region contacting the first region and the second region, wherein (a) the first region has a first set of pores having outer rims, prepared by removing introduced dissolvable nanoparticles, the first set of pores having a first controlled pore size, and a second set of pores connecting the outer rims of the first set of pores, the second set of pores having a second controlled pore size, and a polymer matrix supporting the first set of pores, wherein the first controlled pore size is greater than the second controlled pore size, (b) the second region comprises a third set of pores prepared by phase inversion, the third set of pores having a third controlled pore size wherein the third controlled pore size is larger than the second controlled pore size, and the second region has an asymmetric pore structure, and (c) the additional region has a fourth set of pores having outer rims, prepared by removing introduced dissolvable nanoparticles, the fourth set of pores having a fourth controlled pore size, and a fifth set of pores connecting the outer rims of the fourth set of pores, the fifth set of pores having a fifth controlled pore size, and a polymer matrix supporting the fourth set of pores, wherein the fourth controlled pore size is greater than the fifth controlled pore size and the third controlled pore size is larger than the fifth controlled pore size.

In this example, the third controlled pore size is less than the first controlled pore size, the fourth controlled pore size is greater than the first and second controlled pore sizes, and the fifth controlled pore size is less than the first controlled pore size and greater than the second controlled pore size.

A first preparation of dissolvable nanoparticles (for preparing the first region) is prepared in stock solution as follows: In a jacketed flask kept at 25° C., a solution is prepared consisting of 0.3 mol/L $NH_3$, 9.16 mol/L ETOH, 23.74 mol/L DI water, 0.15 mol/L TEOS, and 0.0078 mol/L $CH_3COOLi$, and stirred at 200 rpm for 1 hr. Dynamic light scattering and SEM show particle diameters of approximately 160 nm. Particles are centrifuged, decanted, and re-suspended in ETOH twice. Then, the particles are centrifuged, decanted, and re-suspended in DMF along with 0.1% TEA three times. The stock solution has a final concentration of 55% (w/w) particles.

A first stock polymer (resin) solution (to be combined with the first particle stock solution for preparing the first region) is prepared as follows: In a jacketed kettle kept at 40° C. using a circulating bath, 30% (w/w) PES resin (BASF, Ultrason E 6020 P), 15% (w/w) NMP, and 55% (w/w) DMF are mixed at 800 rpm using an overhead mixer for 4 hr. The solution is placed under vacuum at 200 mbar for 30 minutes to deaerate the solution.

A first casting solution (for preparing the first region) is prepared as follows: The first resin stock solution and the first particle stock solution are combined in a flask along with PVP K90 and PEG-1000 and mixed at 30,000 rpm for 2 min with final concentrations of 42% (w/w) particles, 11% PES, 5% NMP, 41% DMF, 0.5% PVP K90, and 0.5% PEG-1000, followed by deaeration at 200 mbar for 30 min.

An additional preparation of dissolvable nanoparticles (for preparing the additional region) is prepared in stock solution as follows: In a jacketed flask kept at 25° C., a solution is prepared consisting of 0.9 mol/L $NH_3$, 9.16 mol/L ETOH, 23.07 mol/L DI water, 0.15 mol/L TEOS, and 0.0078 mol/L lithium acetate ($CH_3COOLi$), and stirred at 200 rpm for 1 hr. Dynamic light scattering and SEM show particle diameters of approximately 310 nm. Particles are centrifuged, decanted, and re-suspended in ETOH twice. Then, the particles are centrifuged, decanted, and re-suspended in DMF along with 0.1% TEA three times. The stock solution has a final concentration of 55% (w/w) particles.

An additional polymer (resin) stock solution (to be combined with the second particle stock solution for preparing the additional region) is prepared as follows: In a jacketed kettle kept at 40° C. using a circulating bath, 30% (w/w) PES resin (BASF, Ultrason E 6020 P), 15% (w/w) NMP, and 55% (w/w) DMF are mixed at 800 rpm using an overhead mixer for 4 hr. The solution is placed under vacuum at 200 mbar for 30 minutes to deaerate the solution.

An additional casting solution (for preparing the additional region) is prepared as follows: The additional resin stock solution and the additional particle stock solution are combined in a flask along with PVP K90 and PEG-1000 and mixed at 30,000 rpm for 2 min with final concentrations of 42% (w/w) particles, 11% PES, 5% NMP, 41% DMF, 0.5% PVP K90, and 0.5% PEG-1000, followed by deaeration at 200 mbar for 30 min.

PVOH stock solution is prepared as follows: In a jacketed kettle kept at 90° C., a solution is prepared by combining 10% w/w PVOH (96% Hydrolyzed, Scientific Polymer Products) with 90% DI water and stirring at 200 rpm for 16 hr.

Using a casting bar gapped to 5 mil, PVOH stock solution is cast onto a glass plate and placed in an oven at 80° C. for 2 hr. to form a film. Subsequently, the additional casting solution is cast onto the PVOH film using a 3 mil gapped casting bar and placed in an oven for 15 min at 60° C.

Using a casting bar gapped to 5 mil, the first casting solution is cast on the coated PVOH-coated plate, and placed in an oven for 15 min at 60° C.

A third polymer (resin) stock solution (a casting solution for preparing the second region including pores prepared by phase inversion) is prepared as follows: In a jacketed kettle kept at 47° C. using a circulating bath, 11% (w/w) PES resin (BASF, Ultrason E 6020 P), 46% NMP, 38% PEG-200, 4% DI water, and 1% PVP are mixed at 800 rpm using an overhead mixer for 4 hr. The solution is placed under vacuum at 200 mbar for 30 minutes to deaerate the solution.

Using a casting bar gapped to 5 mil, the third polymer solution is cast on the coated PVOH-coated plate, and immersed in a coagulation bath (1:1 NMP:DI water) for 5 min., then immersed in DI water at 80° C. for 1 hr. The membrane is soaked in 1 mol/L HCl for 30 min., followed by soaking in 2 mol/L KOH for 18 hr. Subsequently, the membrane is washed with DI water at 25° C. for 2 hr. and dried at 70° C. for 30 min.

Cross-sectional, and enlarged partial cross-sectional SEM views of the membrane are shown in FIGS. 6A-6C, wherein FIG. 6A shows a cross-sectional view, and FIGS. 6B and 6C show enlarged cross-sectional views of the additional region and second region (FIG. 6B) and first region and additional region (FIG. 6C).

Using SEM analysis and porometry, the second set of pores (in the first region, having the first set of pores having outer rims, prepared by removing the first set of introduced dissolvable nanoparticles), that are located in the connections between the outer rims of the first set of pores, have a pore size of about 48 nm.

Using SEM analysis and porometry, the fifth set of pores (in the additional region, having the fifth set of pores having outer rims, prepared by removing the second set of introduced dissolvable nanoparticles), that are located in the connections between the outer rims of the first set of pores, have a pore size of about 93 nm.

As analyzed by SEM, the pore structure in the second region, having the pores prepared by phase inversion, comprises an asymmetric pore structure. Neglecting macrovoids, the pore diameters in the phase inversion region decrease by an order of magnitude in the direction from the interface between the region having the first set of pores having outer rims and the region having the pores prepared by phase inversion (about 1 μm to about 3 μm), to the surface of the region having the pores prepared by phase inversion (about 0.1 μm to about 0.3 μm).

Example 4

This example demonstrates the preparation of a membrane according to another embodiment of the invention, having a first region in contact with a second region, wherein the first region has a first set of pores having outer rims, prepared by removing introduced dissolvable nanoparticles, the first set of pores having a first controlled pore size, and a second set of pores connecting the outer rims of the first set of pores, the second set of pores having a second controlled pore size, and a polymer matrix supporting the first set of pores, wherein the first controlled pore size is greater than the second controlled pore size, and the second region comprises a third set of pores prepared by phase inversion, the third set of pores having a third controlled pore size wherein the third controlled pore size is smaller than the first controlled pore size, and the third controlled pore size is larger than the second controlled pore size, and the second region has an asymmetric pore structure.

Dissolvable nanoparticles are prepared in stock solution as follows: Dissolvable particles are prepared in stock solution as follows: In a jacketed flask kept at 25° C., a solution is prepared consisting of 1 mol/L $NH_3$, 8.24 mol/L ETOH, 1 mol/L MeOH, 23.7 mol/L DI water, 0.15 mol/L TEOS and 0.0078 mol/L $Na_2SiO_3$, and stirred at 200 rpm for 1 hr. Dynamic light scattering and SEM show particle diameters of approximately 570 nm. Particles are centrifuged, decanted, and re-suspended in ETOH twice. Then, the particles are centrifuged, decanted, and re-suspended in DMF along with 0.1% TEA three times. The stock solution has a final concentration of 60% (w/w) particles.

The polymer (resin) stock solution is prepared as follows: In a jacketed kettle kept at 50° C. using a circulating bath, 17% (w/w) PAN resin (Scientific Polymer Products), 0.3% PVP K30, and 82.7% DMF are mixed at 100 rpm using an overhead mixer for 5 hr. The solution is placed under vacuum at 200 mbar for 30 min. to deaerate the solution.

The first casting solution is prepared as follows: The resin stock solution and the particle stock solution are combined in a flask and mixed at 30,000 rpm for 2 min with final concentrations of 30% (w/w) particles, 9% PAN, <0.1% PVP, and 61% DMF, followed by deaeration at 200 mbar for 30 min.

PVOH stock solution is prepared as follows: In a jacketed kettle kept at 90° C., a solution is prepared by combining 10% w/w PVOH (96% Hydrolyzed, Scientific Polymer Products) with 90% DI water and stirring at 200 rpm for 16 hr. Using a casting bar gapped to 5 mil, PVOH stock solution is cast onto a glass plate and placed in an oven at 80° C. for 2 hr. to form a film. Subsequently, the additional casting solution is cast onto the PVOH film using a 3 mil gapped casting bar and placed in an oven for 15 min at 60° C.

Using a casting bar gapped to 5 mil, the first casting solution is cast on the coated PVOH-coated plate, and placed in an oven for 15 min at 60° C.

The second casting solution (for preparing the second region) is prepared as follows: In a jacketed kettle kept at 50° C. using a circulating bath, 17% (w/w) PAN resin (Scientific Polymer Products), 0.3% PVP K30, and 82.7% DMF are mixed at 100 rpm using an overhead mixer for 5 hr. The solution is placed under vacuum at 200 mbar for 30 min. to deaerate the solution.

Using a 5 mil casting bar, the second casting solution is cast on the coated PVOH-coated plate, and immersed in a coagulation bath (1:1 DMAC:DI water) for 10 min., then immersed in DI water at 60° C. for 15 min. The membrane is soaked in 1 mol/L HCl for 30 min., followed by soaking in 0.5 mol/L KOH for 18 hr. Subsequently, the membrane is washed with DI water at 25° C. for 2 hr. and dried at 70° C. for 30 min.

Cross-sectional, and enlarged partial cross-sectional SEM views of the membrane are shown in FIGS. 7A and 7B.

Using SEM analysis and porometry, the second set of pores (in the first region, having the first set of pores having outer rims, prepared by removing the first set of introduced dissolvable nanoparticles), that are located in the connections between the outer rims of the first set of pores, have a pore size of about 171 nm.

Using SEM and atomic force microscopy (AFM) analysis, and neglecting macrovoids, the pore size in the phase inverted region near the interface between the region having the first set of pores having outer rims and the region having the pores prepared by phase inversion is about 0.2 µm and the pore size near the free surface of the region having the pores prepared by phase inversion is about 0.05 µm.

Example 5

This example demonstrates the preparation of a membrane according to another embodiment of the invention, having a first region in contact with a second region, wherein the first region has a first set of pores having outer rims, prepared by removing introduced dissolvable nanoparticles, the first set of pores having a first controlled pore size, and a second set of pores connecting the outer rims of the first set of pores, the second set of pores having a second controlled pore size, and a polymer matrix supporting the first set of pores, wherein the first controlled pore size is greater than the second controlled pore size, and the second region comprises a third set of pores prepared by phase inversion, the third set of pores having a third controlled pore size, wherein the third controlled pore size is larger than the first controlled pore size, and the third controlled pore size is larger than the second controlled pore size.

Dissolvable nanoparticles are prepared in stock solution as follows: Dissolvable particles are prepared in stock solution as follows: In a jacketed flask kept at 25° C., a solution is prepared consisting of 1 mol/L $NH_3$, 8.24 mol/L ETOH, 1 mol/L MeOH, 23.7 mol/L DI water, 0.15 mol/L TEOS and 0.0078 mol/L $Na_2SiO_3$, and stirred at 200 rpm for 1 hr. Dynamic light scattering and SEM show particle diameters of approximately 570 nm. Particles are centrifuged, decanted, and re-suspended in ETOH twice. Then, the particles are centrifuged, decanted, and re-suspended in DMF along with 0.1% TEA three times. The stock solution has a final concentration of 60% (w/w) particles.

The polymer (resin) stock solution is prepared as follows: In a jacketed kettle kept at 38° C. using a circulating bath, 33% (w/w) PVDF resin (Solvay), and 67% DMAC are mixed at 800 rpm using an overhead mixer for 12 hr. The solution is placed under vacuum at 200 mbar for 30 min. to deaerate the solution.

The first casting solution is prepared as follows: The resin stock solution and the particle stock solution are combined in a flask and mixed at 30,000 rpm for 2 min with final concentrations of 35% (w/w) particles, 14% PVDF, 27% DMAC, and 24% DMF, followed by deaeration at 200 mbar for 30 min.

Using a casting bar gapped to 5 mil, the first casting solution is cast onto a glass plate.

The second casting solution (for preparing the second region) is prepared as follows: In a jacketed kettle kept at 57° C. using a circulating bath, 20% (w/w) PVDF resin (Solvay) and 80% DMAC are mixed at 800 rpm using an overhead mixer for 24 hr. The solution is placed under vacuum at 200 mbar for 30 min. to deaerate the solution.

Using a 10 mil casting bar, the second casting solution is cast on the coated glass plate, and placed in an oven at 50° C. for 30 min.

The membrane is soaked in 1 mol/L HCl for 1 hr., followed by soaking in 2 mol/L KOH for 5 hr. Subsequently, the membrane is washed with DI water at 25° C. for 2 hr. and dried at 50° C. for 30 min.

A cross-sectional SEM view of the membrane shown in FIG. 8.

Using SEM analysis and porometry, the second set of pores (in the first region, having the first set of pores having outer rims, prepared by removing the first set of introduced dissolvable nanoparticles), that are located in the connections between the outer rims of the first set of pores, have a pore size of about 171 nm.

As analyzed by SEM, the pore structure in the second region, having the pores prepared by thermally induced phase inversion, comprises a pore structure composed of pores having diameters of about 5 µm to about 10 µm.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A microporous membrane comprising
   (A) a single integral layer having
      (i) a first microporous surface;
      (ii) a second microporous surface; and,
      (iii) a porous bulk between the first microporous surface and the second microporous surface, wherein the bulk comprises at least a first region and a second region;
         (a) the first region comprising a first set of hexagonally packed pores having outer rims, prepared by removing introduced dissolvable silica nanoparticles, the first set of pores having a first controlled pore size of about 310 nm to about 360 nm, and a second set of pores connecting the outer rims of the first set of pores, the second set of pores having a second controlled pore size, and a polyethersulfone polymer matrix supporting the first set of pores, wherein the first controlled pore size is greater than the second controlled pore size, and wherein the first region has a void volume fraction of about 66% to 74%;
         (b) the second region comprising a polyethersulfone polymer and a third set of pores prepared by phase inversion, the third set of pores having a third controlled pore size wherein the third controlled pore size is at least about 10% less than the first controlled pore size, and
         (c) at least one additional region arranged between the first region and the second region, the additional region comprising a polyethersulfone polymer and at least a fourth set of pores comprising hexagonally packed pores having a fourth controlled pore size of about 520 nm to about 630 nm, wherein the fourth set of pores have outer rims, prepared by removing introduced dissolvable silica nanoparticles, and the additional region further comprises a fifth set of pores connecting the outer rims of the fourth set of pores, the fifth set of pores having a fifth controlled pore size, and a polymer matrix comprising the polyethersulfone polymer of the at least one additional region supporting the fourth set of pores, wherein the fourth controlled pore size is greater than the fifth controlled pore size, and wherein the additional region has a void volume fraction of about 66% to 74%;
      wherein the third controlled pore size is greater than the fifth controlled pore size, the fourth controlled pore size is greater than the first controlled pore size and the second controlled pore size, and the fifth controlled pore size is less than the first controlled pore size and greater than the second controlled pore size.

2. The membrane of claim 1, wherein the third set of pores provides a symmetric pore structure.

3. The membrane of claim 1, wherein the third set of pores provides an asymmetric pore structure.

4. A method of filtering a fluid, the method comprising passing the fluid through the membrane of claim 1.

5. A method of preparing a microporous membrane comprising
   (A) a single integral layer having
      (i) a first microporous surface;
      (ii) a second microporous surface; and,
      (iii) a porous bulk between the first microporous surface and the second microporous surface, wherein the bulk comprises at least a first region and a second region;
         (a) the first region comprising a first set of pores having outer rims, prepared by removing introduced dissolvable silica nanoparticles, the first set of pores having a first controlled pore size of about 310 nm to about 360 nm, and a second set of pores connecting the outer rims of the first set of pores, the second set of pores having a second controlled pore size, and a polyethersulfone polymer matrix supporting the first set of pores, wherein the first controlled pore size is greater than the second controlled pore size, and wherein the first region has a void volume fraction of about 66% to 74%;
         (b) the second region comprising a polyethersulfone polymer and a third set of pores prepared by phase inversion, the third set of pores having a third controlled pore size wherein the third controlled pore size is at least about 10% less than, or at least about 10% greater than, the first controlled pore size, and
         (c) at least one additional region arranged between the first region and the second region, the additional region comprising a polyethersulfone polymer and at least a fourth set of pores comprising hexagonally packed pores having a fourth controlled pore size of about 520 nm to about 630 nm, wherein the fourth set of pores have outer rims, prepared by removing introduced dissolvable silica nanoparticles, and the additional region further comprises a fifth set of pores connecting the outer rims of the fourth set of pores, the fifth set of pores having a fifth controlled pore size, and a polymer matrix comprising the polyethersulfone polymer of the at least one additional region supporting the fourth set of pores, wherein the fourth controlled pore size is greater than the fifth controlled pore size, and wherein the additional region has a void volume fraction of about 66% to 74%;

wherein the third controlled pore size is greater than the fifth controlled pore size, the fourth controlled pore size is greater than the first controlled pore size and the second controlled pore size, and the fifth controlled pore size is less than the first controlled pore size and greater than the second controlled pore size;

the method comprising:

(a) casting a dissolvable silica nanoparticle-containing polyethersulfone polymer solution onto a substrate or onto a film on the substrate;

($a^1$) casting an additional dissolvable silica nanoparticle-containing polyethersulfone polymer solution on the coated substrate of (a);

(b) casting a polyethersulfone polymer solution lacking dissolvable silica nanoparticles onto the coated substrate of ($a^1$), carrying out phase inversion and obtaining a membrane;

(c) dissolving the nanoparticles and obtaining a nanoparticle-depleted membrane comprising the first region, the second region, and the additional region; and, (d) washing the nanoparticle-depleted membrane.

6. A method of filtering a fluid, the method comprising passing the fluid through the membrane of claim 2.

7. A method of filtering a fluid, the method comprising passing the fluid through the membrane of claim 3.

8. The microporous membrane of claim 1, wherein the polymer of the polymer matrix of the first region, and the polymer of the second region, and the polymer of the polymer matrix of the at least one additional region, each comprise polysulfone.

\* \* \* \* \*